(12) United States Patent (10) Patent No.: US 8,007,388 B2
Simonov et al. (45) Date of Patent: Aug. 30, 2011

(54) PLATE-LINK CHAIN

(75) Inventors: Anton Simonov, Bühl (DE); Michael Pichura, Bühl (DE); Olga Ispolatova, Bühl (DE); Marcus Junig, Bühlertal (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 160 days.

(21) Appl. No.: 11/904,038

(22) Filed: Sep. 24, 2007

(65) Prior Publication Data

US 2008/0085794 A1 Apr. 10, 2008

Related U.S. Application Data

(60) Provisional application No. 60/875,977, filed on Dec. 20, 2006.

(30) Foreign Application Priority Data

Sep. 23, 2006 (DE) .......................... 10 2006 045 010

(51) Int. Cl.
*F16G 13/04* (2006.01)
(52) U.S. Cl. ........................................ 474/215
(58) Field of Classification Search .......... 474/212–217, 474/245
See application file for complete search history.

(56) References Cited

U.S. PATENT DOCUMENTS

| 1,469,391 | A | * | 10/1923 | Morse | 474/216 |
| 1,563,065 | A | * | 11/1925 | Belcher | 474/215 |
| 1,678,450 | A | * | 7/1928 | Sturtevant | 474/216 |
| 1,743,500 | A | * | 1/1930 | Sturtevant | 474/215 |
| 1,770,989 | A | * | 7/1930 | Morse | 474/216 |
| 5,026,331 | A | * | 6/1991 | Sugimoto et al. | 474/214 |
| 6,387,003 | B2 | * | 5/2002 | Horie et al. | 474/215 |

FOREIGN PATENT DOCUMENTS

WO WO 2008034406 A1 * 3/2008

* cited by examiner

*Primary Examiner* — Robert Siconolfi
*Assistant Examiner* — Stephen Bowes
(74) *Attorney, Agent, or Firm* — Alfred J. Mangels

(57) ABSTRACT

A plate-link chain for a belt-driven conical-pulley transmission having a continuously variable transmission ratio and having a large number of link plates pivotally connected with each other via pairs of rocker members that each includes two rocker members. The rocker members extend transversely to the longitudinal direction of the plate-link chain and are positioned in openings in the link plates. Curved contact surfaces are provided on the rocker members and on the link plate openings, along which curved surfaces of the rocker members and link plates bear against each other to transmit force. Curved rolling surfaces are provided on the rocker members, along which contacting rocker members of a rocker member pair roll against each other and/or slide on each other on pitch lines to transmit force. The link plate openings have at least three inwardly extending, convexly curved regions.

7 Claims, 4 Drawing Sheets

PLATE-LINK CHAIN

BACKGROUND OF THE INVENTION

1. Field of the Invention

The present invention relates to a plate-link chain, in particular for a belt-driven conical-pulley transmission having a continuously variable transmission ratio, having a large number of link plates pivotally connected with each other via pairs of rocker members that comprise two rocker members each, the rocker members running transverse to the longitudinal direction of the plate-link chain and being situated in openings in the link plates and there being curved contact surfaces situated on the rocker members and the link plates, along which curved surfaces the rocker members and link plates bear against each other to transmit force, and there being curved rolling surfaces situated on the rocker members, along which the rocker members roll on each other and/or slide on each other on pitch lines to transmit force.

2. Description of the Related Art

Such a plate-link chain can be employed for example as a means of transmitting tractive force in a belt-driven conical-pulley transmission for a motor vehicle or the like, and there transmit the tractive force by means of frictional contact between the rocker members and the conical disk surfaces of the two conical disk pairs. The plate-link chain may also be designed as a toothed chain and transmit tractive force from a driving to a driven chain wheel.

A plate-link chain designed as a toothed chain normally has a device for tensioning the toothed chain in the slack strand. This device for tensioning the toothed chain serves for example to prevent pulsating of the toothed chain due to vibration excitation, and also to shape the entry process of the teeth of the toothed chain onto a chain wheel so that tooth skipping is prevented. On the chain wheels the toothed chain is deflected in such a way that the center of curvature of the portion of the toothed chain that is curved in the region of the deflection lies within the closed chain section.

In contrast, when a chain tensioner in the form for example of a chain tensioning bar acts on the back of the link plates, the toothed chain undergoes a curvature that differs from the curvature that occurs in the region of the deflection; the particular portion of the toothed chain which is acted on by the chain tensioner is curved in the opposite direction and the center of curvature of this portion of the toothed chain lies outside of the closed chain section of the plate-link chain. A curvature of this sort is referred to as swing-back.

To limit the deflection angle of the swing-back process for example from the stretched position, in known versions of plate-link chains for belt-driven conical-pulley transmissions and toothed chains there is provision for limiting the swing-back in the joint of the lower zone of an adjacent link plate.

The mode of functioning here is such that a rocker member comes into contact with a region of the lower contact surface of the adjacent link plate. Thus the striking of the rocker member on the contact surface of the adjacent link plate occurs in a zone that is already critically loaded due to the transmission of tensile force from the rocker member to the link plate. Hence in this zone of concentrated tension due to the transmission of tensile force, yet another additional overlay of forces occurs, and thus tensions due to the swing-back protection. In the operation of the toothed chain this can result in increased wear, and ultimately to early fatigue failure. The fatigue strength of the toothed chain is reduced.

Plate-link chains that have become known heretofore had symmetrical rocker members, which were situated in openings in the link plates. These known rocker members are symmetrical in construction in reference to a plane of symmetry that divides the rocker members into an upper and a lower half. As a result of this configuration, a distance from the inner peripheral rim of the opening that receives the rocker members to an outer peripheral edge of the link plate in the region of a so-called lower yoke is made smaller, and thus the cross sectional region available for transmitting force is reduced in size.

In consequence, a concentration of tension appears in this region between the opening of the link plate and the edge of the link plate, which ultimately results in a reduction of the service life and of the force transmitting capability of the plate-link chain. To counter this problem, a plate-link chain has already become known which has asymmetrical rocker members in the direction of the rocker member height and thereby makes sure that the workpiece stresses which arise in the upper and lower contact surface regions between rocker member and link plate are significantly reduced, so that the service life of the chain increases as a result.

With a plate-link chain of this sort it is significant that the asymmetrical rocker members are inserted into the openings in the link plates in the correct orientation, since otherwise the pitch surfaces of the rocker members that are intended for transmitting force cannot roll on each other as intended, with the consequence that jamming of the rocker members in the opening can occur, and thus a malfunction that may result in failure of the plate-link chain.

To achieve this correct orientation of the rocker members in the openings of the link plates, a plate-link chain has already become known on the basis of unpublished German patent application DE 10 2005 061 081.1, owned by the assignee of the present application, whose link plates have a region that is bowed (curved) in an inward direction, so that if the rocker members are oriented incorrectly an overlapping of the outer contour of the rocker members with the inside contour of the opening occurs in the link plates, so that the rocker member which is not installed in the correct orientation can no longer be inserted into the opening of the link plate, and in this way erroneous installation of the rocker members in the openings of the link plates is avoided.

It has been found that this known plate-link chain already provides an improvement compared to the plate-link chain described above, in regard to additional tension on the tension-critical zone in the region of the lower yoke of the link plate. But even this known plate-link chain has room for improvement in regard to the stress in the described tension-critical zone due to the striking of the rocker member on a contact surface of an adjacent link plate to protect against swing-back.

Starting from this point, an object of the present invention is now to refine the known plate-link chain in such a way that the force applied to the plate-link chain due to the striking of the rocker member on the link plate to limit the swing-back angle takes place in a less tension-critical zone along the opening of the link plate.

SUMMARY OF THE INVENTION

To solve this problem, the invention now has the features indicated in claim 1. Advantageous refinements thereof are described in the additional claims.

The object is accordingly achieved by a plate-link chain, in particular for a belt-driven conical-pulley transmission with variable transmission ratio, having a large number of link plates pivotally connected with each other via pairs of rocker members that comprise two rocker members each, the rocker members running transverse to the longitudinal direction of the plate-link chain and being situated in openings in the link plates and there being curved contact surfaces situated on the rocker members and the link plates, along which curved surfaces the rocker members and link plates bear against each other to transmit force, and there being curved rolling surfaces situated on the rocker members, along which the rocker members roll on each other and/or slide on each other on pitch lines to transmit force, the openings having at least three regions that are curved convexly inward.

Preferably, it is provided that two of the inwardly curved regions, namely a first inwardly curved region and a second inwardly curved region, when seen in the cross sectional view in the direction of the rocker member height, lie essentially within a region that is formed by a first contact point line through pitch lines of two adjacent rocker member pairs in a swing-back, and a second contact point line through pitch lines of two adjacent rocker member pairs when the plate-link chain is in the completely bent state.

Preferably, it is further provided that a third inwardly curved region lies outside of the region that is formed by a first contact point line through pitch lines of two adjacent rocker member pairs in a swing-back and a second contact point line through pitch lines of two adjacent rocker member pairs when the plate-link chain is in the completely bent state.

Preferably, it is further provided that when the plate-link chain is in the bent state the third inwardly curved region lies radially outside of the region that is formed by a contact point line through pitch lines of two adjacent rocker member pairs in a swing-back and a second contact point line through pitch lines of two adjacent rocker member pairs when the plate-link chain is in the completely bent state.

Preferably, it is further provided that the rocker members are asymmetrically formed in a cross section running in the longitudinal direction of the plate-link chain in the direction of the rocker member height.

The object identified above is also achieved by a link plate for use in a plate-link chain and having openings for receiving rocker members, wherein the openings have at least three inwardly convexly curved regions.

The object identified above is also achieved through the use of a plate-link chain in accordance with the invention in a belt-driven transmission, in particular a belt-driven conical-pulley transmission with variable transmission ratio.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
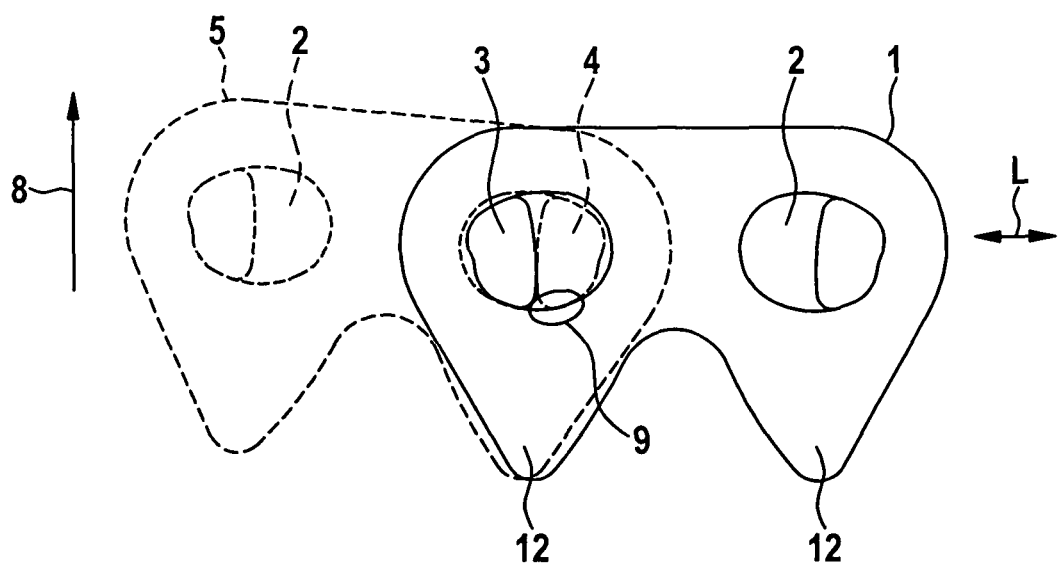
FIG. 1 is a schematic representation of a portion of a known plate-link chain in the form of a toothed chain in a swing-back process.

FIG. 1 shows a portion of a known plate-link chain with two adjacent link plates 1 and 5 and rocker members 3, 4 situated in openings 2. The longitudinal direction, also referred to as the chain running direction, is designated as L, the upward direction is identified by an arrow 8. When passing around a conical disk pair of a conical pulley transmission, the plate-link chain is bent contrary to the direction of arrow 8, so that arrow 8 simultaneously marks the radial outward direction when the chain is passing around a conical disk pair. In this known plate-link chain in the form of a toothed chain, during a swing-back process which is represented by the dashed link plate 5 and its swiveling motion in the upward direction in the plane of the drawing, a contact takes place between the dashed rocker member 4 of the dashed link plate 5 and the link plate 1 depicted with a solid line, in the region of the bottom of the opening 2 of link plate 1 designated as 9. In this contact region a relatively high tension prevails in link plate 1. The plate-link chain is designed as a toothed plate-link chain, and includes two teeth 12 per link plate 1. The plate-link chain can also be designed as a plate-link chain without teeth 12, however.

Figure 2:
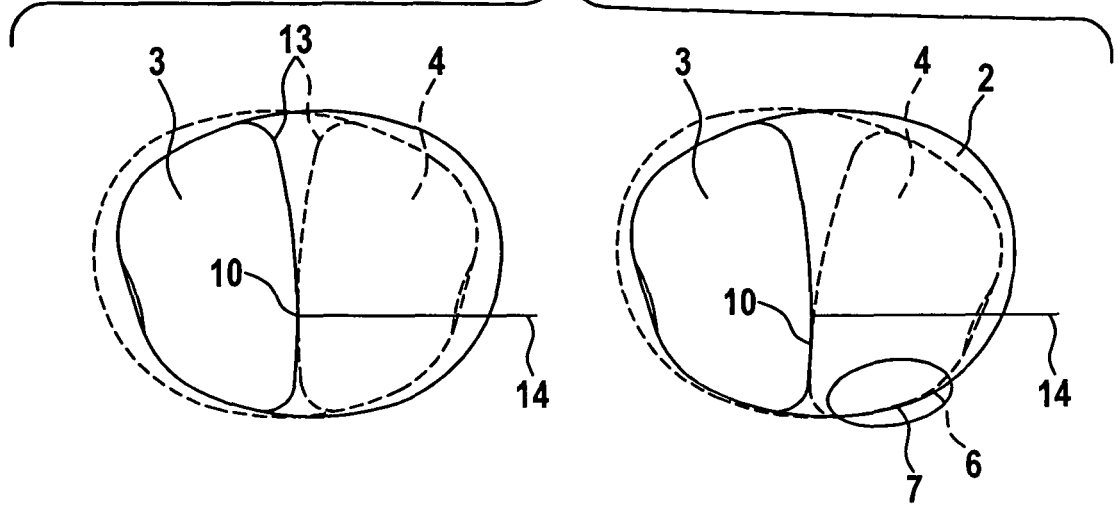
FIG. 2 shows on the right side an enlarged view of an opening in a plate-link chain of the type shown in FIG. 1 to explain the striking of a rocker member on a link plate during a swing-back process, and in the left side of the drawing an enlarged view of the opening to explain the contact-point line or pitch line.

FIG. 2 shows in the right half of the drawing an enlarged depiction of the region of opening 2, with rocker member 4 in swiveled position due to the swiveling motion of the dashed link plate 5 in FIG. 1. Rocker member 3 belongs to the right-hand link plate 1 in FIG. 1, while rocker member 4 belongs to the left-hand link plate 5 in FIG. 1, so that when a swiveling motion of link plate 5 occurs during a swing-back of the toothed chain, a force-transmitting contact takes place between a lower contact surface 6 of rocker member 4 and a lower contact surface 7 of opening 2 of link plate 1.

FIG. 2 shows in the left half of the drawing pitch line 10 between the two rocker members 3, 4 in the tight chain strand. The two rocker members 3, 4 roll on each other along a respective pitch surface 13, and form the pitch line 10 in the tight strand. If this pitch line 10 is joined with a pitch line 10 of another adjacent rocker member pair, then it is possible to stretch through these two lines which project perpendicular to the plane of the drawing, which are dots 10 in the two-dimensional depiction, a contact point line or pitch line 14, which connects the contact points of adjacent rocker member pairs with each other. As FIG. 2 shows in the right-hand illustration, in the event of swing-back of the known plate-link chain the contact zone designated as 9 lies between rocker member 4 and link plate 1 in the height direction of the rocker members, below contact point line 14.

Figure 3:
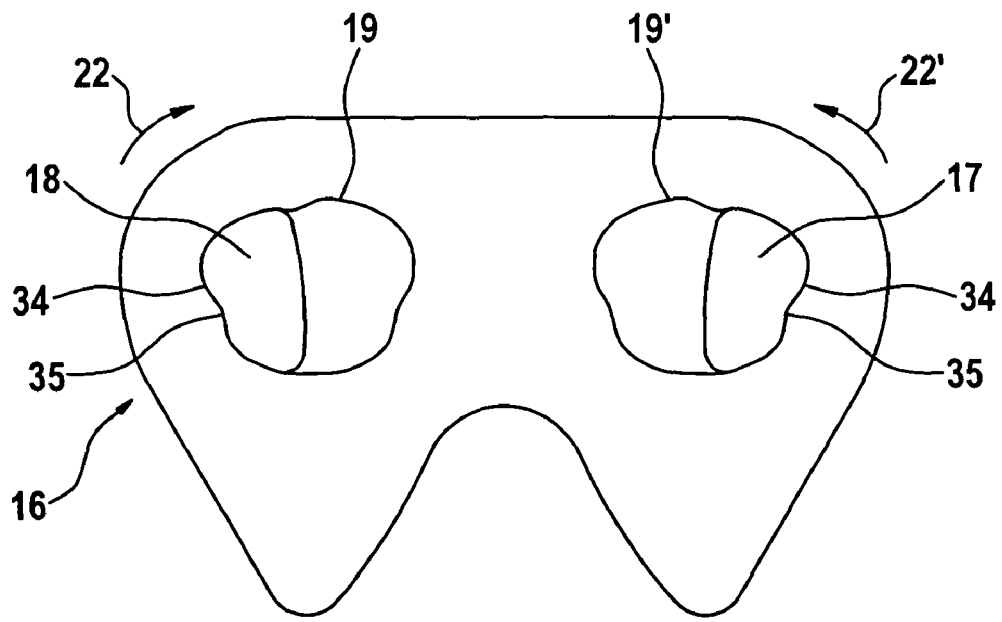
FIG. 3 is a side view of a link plate in accordance with the invention.
Figure 4:
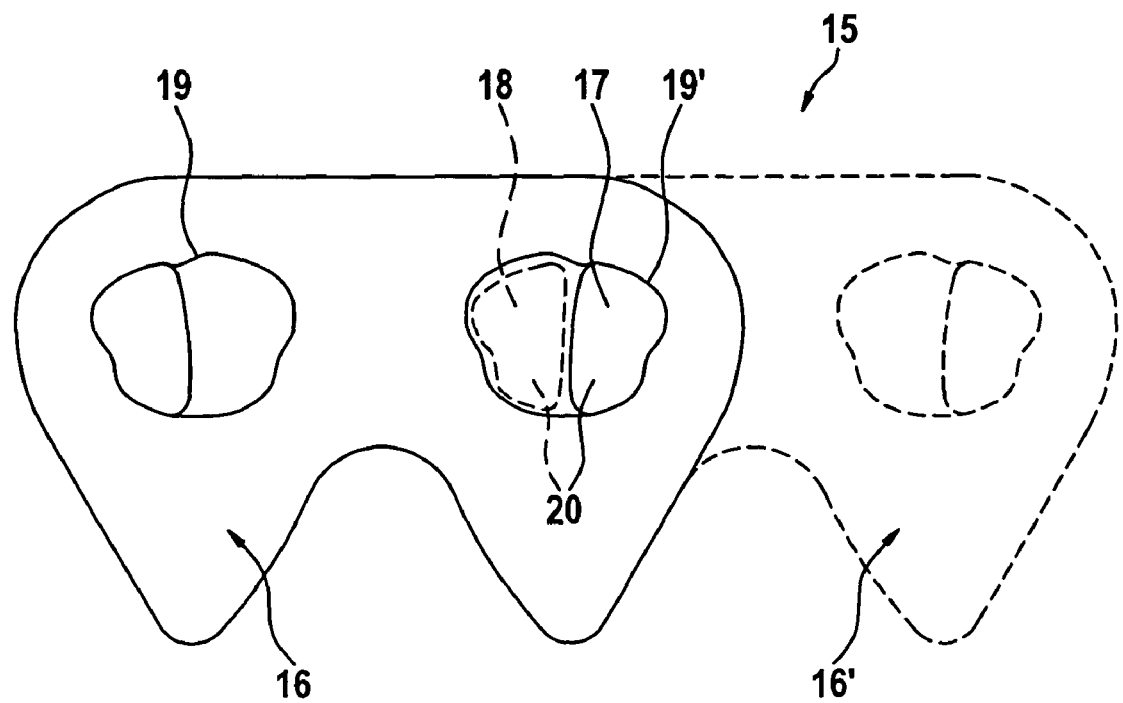
FIG. 4 shows two adjacent plates of the type shown in FIG. 3 within a plate-link chain.

FIG. 3 shows a link plate 16 in accordance with the invention, with openings in accordance with the invention that have been given the reference labels 19 and 19'. The rocker members 17 and 18 assigned to link plate 15 are depicted in the openings 19, 19'. FIG. 4 shows two adjacent plates 16 in accordance with FIG. 3 within the arrangement of a plate-link chain 15. The plates are designated with the reference labels 16 and 16', with link plate 16 being depicted with solid lines and link plate 16' being depicted with dashed lines. As can be seen, one rocker member 17 of the link plate 16 depicted with solid lines and one rocker member 18 of the link plate 16' depicted with dashed lines form a rocker member pair 20. The rocker member pairs 20 form a rocker joint, in which the rocker members 17, 18 roll on each other. The openings 19, 19' have curved contact surfaces 34 on the plates, against which the rocker members bear with contact surfaces 35 on the rocker members to transfer force.

Figure 5:
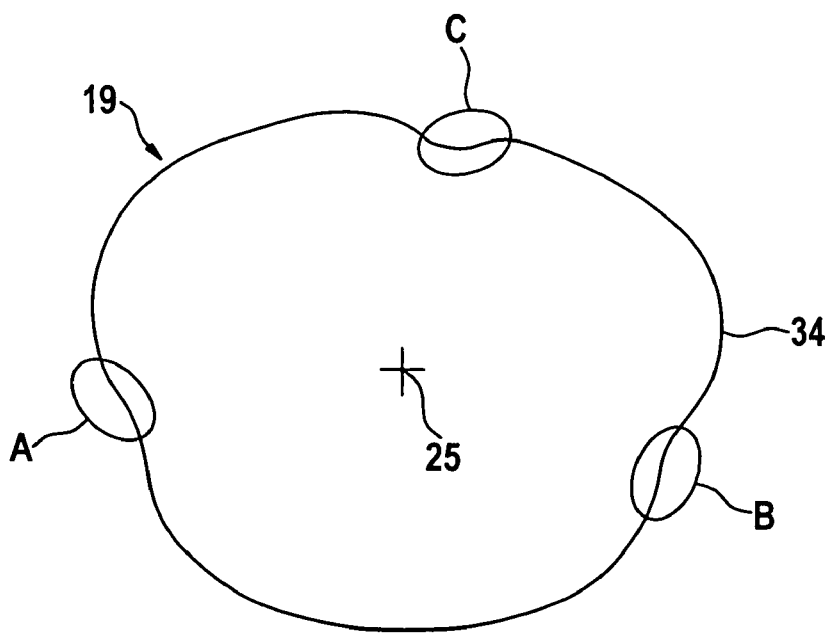
FIG. 5 shows an enlarged view of an opening in a link plate corresponding with the link plate shown in FIGS. 3 and 4.
Figure 6:
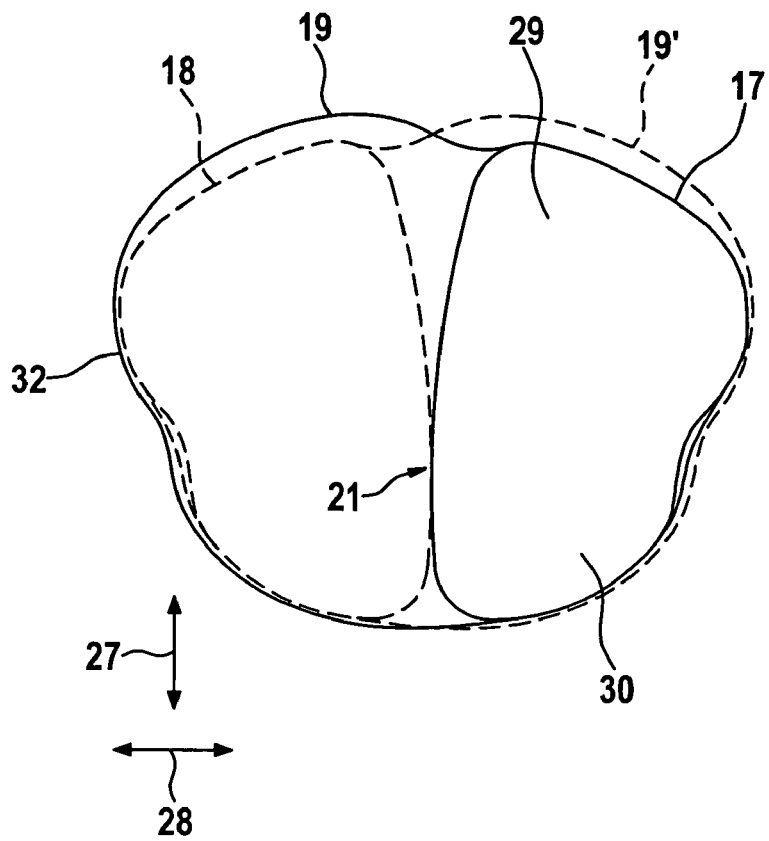
FIG. 6 shows an enlarged view of openings and rocker members of two adjacent plates corresponding with the link plate shown in FIG. 4 when the plate-link chain is in an extended condition.

FIG. 5 shows an opening 19, here the opening 19 depicted on the left in FIG. 3. The opening 19 includes three regions curved convexly toward the inside, i.e. in the direction of an imaginary center point 25 of the opening, namely a first inward-curved convex region A, a second inward-curved convex region B and a third inward-curved convex region C. Opening center point 25 can be understood for example as the center of mass of opening 19. Opening center point 25 serves here only to describe more exactly what is meant by convex curvature. FIG. 6 shows with a solid line opening 19 in accordance with FIG. 5 and opening 19' of a neighboring link plate 16' (not shown) adjacent to the right in the drawing plane of FIG. 6, as well as with a solid line the rocker member 17 assigned to opening 19 and with a dashed line the rocker member 18 assigned to opening 19'. Here rocker members 17, 18 are inserted into openings 19 and 19' of link plates 16 and 16'. Rocker members 17, 18 are asymmetrically formed in the direction of the rocker member height, which is designated with a double arrow 27 in FIG. 6, with a wider region in upper half 29 of the rocker member in the direction of the double arrow 28 than in the lower half 30 of the rocker member. Rocker member 18 is supported in opening 19' of the right-hand link plate 16' in FIG. 4 (depicted with dashed lines), while rocker member 17 is supported in opening 19 of the left-hand link plate 16, depicted in the drawing with solid lines.

Figure 7:
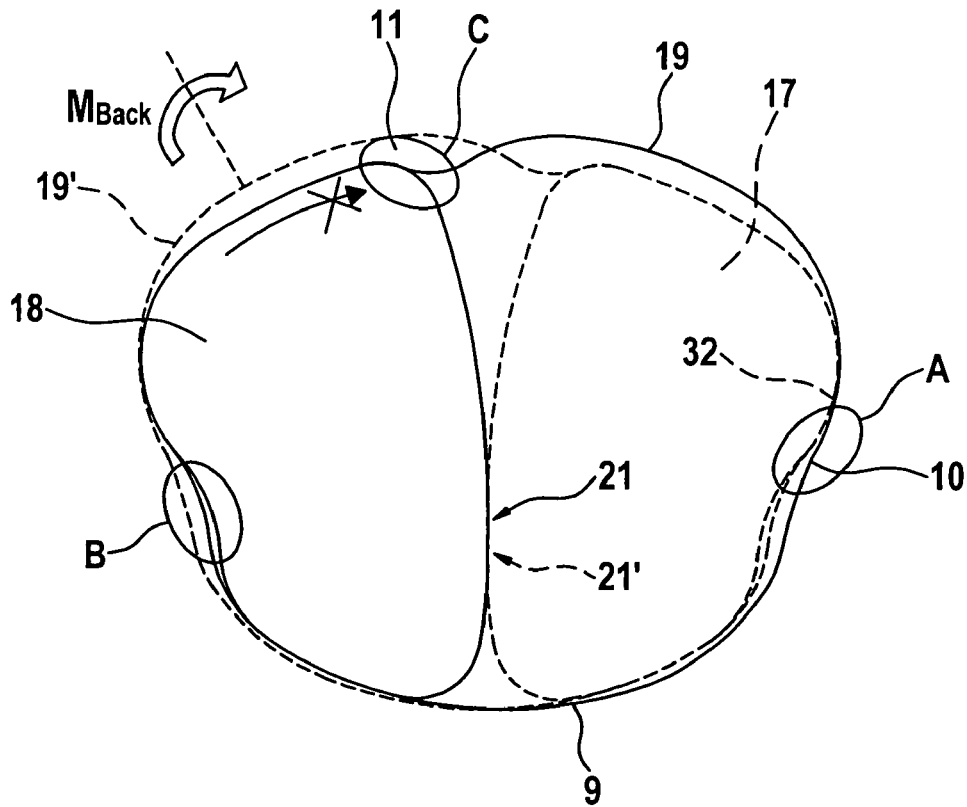
FIG. 7 is a side view similar to FIG. 6 when the plate-link chain is in a swing-back condition.

Rocker members 17, 18 are in contact along a pitch line 21 that extends in the direction of the drawing plane. FIG. 6 shows the pitch line 21 with a plate-link chain 15 that is stretched, i.e. straight and not curved, bent or deflected. FIG. 7 shows the depiction in accordance with FIG. 6 with a back-oscillating plate-link chain 15. A swing-back moment $M_{Back}$ is exerted here on the plates 16, which causes a relative rotation of the rocker members 17, 18 in their respective openings 19 and 19'. In the depiction in FIG. 3 a relative rotation of rocker member 18 in opening 19 in the direction of arrow 22 is caused by the moment $M_{Back}$ depicted in FIG. 7; correspondingly, a relative rotation of rocker member 17 is caused with respect to opening 19 in the direction of arrow 22' in FIG. 3. That causes a shift of pitch line 21 to occur, as depicted in FIG. 7. Drawn in FIG. 7 is pitch line 21 as drawn in FIG. 6, as well as a pitch line 21' that is assumed in the swing-back process depicted in FIG. 7. The inwardly curved region C, which is identified in FIG. 7 for the opening 19 depicted with a solid line, prevents the relative rotation of the particular rocker member, here of rocker member 18, in the respective opening 19, 19', depicted on the basis of FIG. 8 for rocker member 18 in opening 19. Also depicted in FIG. 7 is the contact region 9 between opening 19 and rocker member 17. The convexly curved first region A serves as a limitation of the swing-back angle of rocker member 17 with respect to opening 19 or to the link plate 16 assigned to opening 19. Further migration of the pitch line 21' in the depiction in FIG. 7 is prevented in this way. The convexly curved third region C together with the convexly curved second region B holds rocker member 18 in a nominal position with respect to opening 19.

Figure 8:
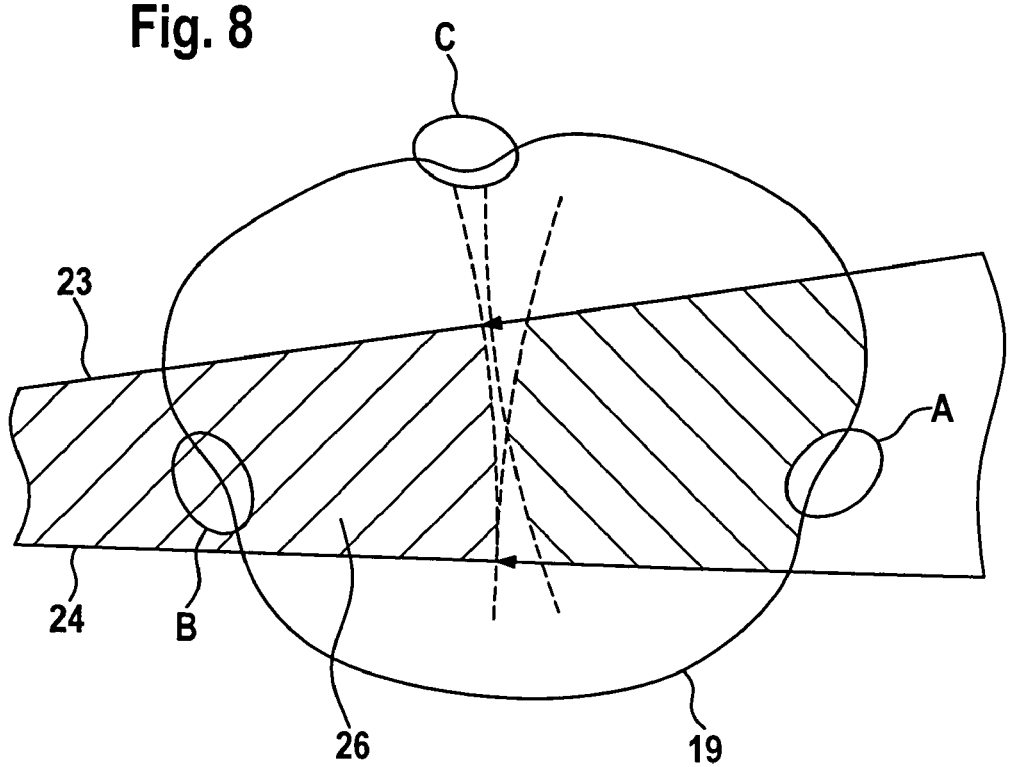
FIG. 8 is a side view similar to FIG. 7 showing a region enclosed by a set of contact point lines.

FIG. 8 shows for the opening 19 depicted in FIG. 5 the region in which the pitch line 21 depicted in FIG. 7 is placed in the extreme possible positions of the plate-link chain, that is, in the completely bent state and during swing-back. The figure depicts a connecting line between the contact points 21 of two adjacent link plates when the plate-link chain 15 is in the fully deflected state; this is designated as a second contact point line 23. Also depicted is a connecting line between the contact points 21 of two adjacent rocker member pairs 20 during swing-back of the plate-link chain; this is designated as the first contact point line 24. The contact point line forms a set of lines for all possible bending angles of the plate-link chain. This overlaps a region bounded by the contact point lines 23, 24. The two contact point lines 23, 24 thus enclose a region 26 shown with shading in FIG. 8. Now the invention provides for the first convexly curved region A and the second convexly curved region B to be located in the shaded region 26, i.e. between contact point lines 23 and 24. The invention also provides for the third convexly curved region C to lie outside of the region 26 enclosed by the contact point lines 23 and 24, namely on the radially outer side when the plate-link chain is in the deflected state, which is thus radially on the outside for example when the plate-link chain is passing around a conical disk pair for example during operation. In the depiction in FIG. 1, the radially outward direction is identified by the arrow 8. On the side lying radially inside the contact point line 24 there are no convexly inward curved regions.

Now if a swing-back motion of the plate-link chain occurs, this results in a swiveling motion of the particular link plate in the direction of the arrows 31 in FIG. 4, and thus to a relative rotating motion of the braced rocker member in the opening of the adjacent link plate, i.e. in FIG. 5 to a relative motion of rocker member 18 relative to opening 19' of the right-hand link plate 16. As that occurs, a face 33 of rocker member 17 comes in contact with the third convexly inward curved region C of opening 19, so that a contact region 11 occurs which is depicted in FIG. 7. Rocker member 17 now butts against second convexly inward curved region B of opening 19 and third convexly inward curved region C of opening 19, so that further rotation is prevented. The contact with the two convexly curved regions B, C causes a much lower stress in the lower region of plate-link chain 16, i.e. the region facing the teeth 12, than created by the contact between rocker member and link plate in contact region 9 in the existing art.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain for a belt-driven conical-pulley transmission having a variable transmission ratio, said chain comprising: a plurality of link plates pivotally connected with each other via pairs of rocker members that include two rocker members each, the rocker members running transversely to the longitudinal direction of the plate-link chain and being situated in openings in the link plates, curved contact surfaces situated on the rocker members and in the openings of the link plates, along which curved surfaces the rocker members and link plates bear against each other to transmit force, and curved rolling surfaces situated on the rocker members along which the rocker members roll on each other and/or slide on each other along pitch lines to transmit force, wherein each of the link plate openings has at least three spaced contact regions that are inwardly convexly curved, and wherein two of the inwardly convexly curved contact regions of each of the plate openings, namely a first inwardly curved contact region and a second inwardly curved contact region, when viewed in a cross sectional view in the direction of the rocker member height, lie on opposed facing surfaces of each of the link plate openings and substantially within an area that is defined between a first contact point line that passes through pitch lines of two adjacent rocker member pairs when the chain is in a swing-back condition, and a second contact point line that passes through pitch lines of two adjacent rocker member pairs when the plate-link chain is in a fully curved condition as the chain passes around a wheel.

2. The plate-link chain in accordance with claim 1, wherein a third inwardly curved contact region of each of the plate openings lies outside of the area that is defined between the first contact point line that passes through pitch lines of two adjacent rocker member pairs when the chain is in a swing-back condition, and the second contact point line that passes through pitch lines of two adjacent rocker member pairs when the plate-link chain is in a fully curved condition as the chain passes around a wheel.

3. The plate-link chain in accordance with claim 2, wherein when the plate-link chain is in the bent state the third inwardly curved contact region lies radially outside of the area that is defined between the first contact point line that passes through pitch lines of two adjacent rocker member pairs when the chain is in a swing-back condition, and the second contact point line that passes through pitch lines of two adjacent rocker member pairs when the plate-link chain is in the fully curved condition as the chain passes around a wheel.

4. The plate-link chain in accordance with claim 3, wherein the rocker members are shaped asymmetrically in the height direction of the rocker members in a cross section running in the longitudinal direction of the plate link chain.

5. A belt-driven transmission including a plate-link chain in accordance with claim 1, wherein the belt-driven transmission is a belt-driven conical-pulley transmission having a continuously variable transmission ratio.

6. The plate-link chain in accordance with claim 1, wherein two of the inwardly convexly curved contact regions of each link plate opening are spaced from each other and lie on one side of a plane that is transverse to the longitudinal direction of the chain and that passes through a center point of the link plate opening, and a third inwardly curved contact region of each link plate opening lies on an opposite side of the plane from that side on which the two inwardly convexly curved contact regions lie.

7. A link plate for use in a plate-link chain, having openings for receiving rocker members, wherein each of the openings has at least three spaced contact regions that are inwardly convexly curved, wherein two of the inwardly convexly curved contact regions of each of the plate openings, namely a first inwardly curved contact region and a second inwardly curved contact region, when viewed in a cross sectional view in the direction of the rocker member height, lie on opposed facing surfaces of each of the link plate openings and substantially within an area that is defined between a first contact point line that passes through pitch lines of two adjacent rocker member pairs when the chain is in a swing-back condition, and a second contact point line that passes through pitch lines of two adjacent rocker member pairs when the plate-link chain is in a fully curved condition as the chain passes around a wheel.

* * * * *